US007953003B2

(12) United States Patent
Moulsley et al.

(10) Patent No.: US 7,953,003 B2
(45) Date of Patent: May 31, 2011

(54) REQUESTING PERMISSION FROM A BASE STATION TO SEND PACKETS QUEUED AT A MOBILE STATION ACCORDING TO ITS TRANSMISSION DELAY

(75) Inventors: Timothy J. Moulsley, Caterham (GB); Matthew P. J. Baker, Canterbury (GB); Paul Bucknell, Brighton (GB); Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 867 days.

(21) Appl. No.: 11/813,696

(22) PCT Filed: Jan. 10, 2006

(86) PCT No.: PCT/IB2006/050090
§ 371 (c)(1),
(2), (4) Date: Jul. 11, 2007

(87) PCT Pub. No.: WO2006/075293
PCT Pub. Date: Jul. 20, 2006

(65) Prior Publication Data
US 2008/0095055 A1    Apr. 24, 2008

(30) Foreign Application Priority Data

Jan. 12, 2005 (GB) .................................. 0500588.9

(51) Int. Cl.
*H04L 12/26* (2006.01)
(52) U.S. Cl. .......... 370/230; 370/229; 370/232; 370/234
(58) Field of Classification Search .................. 370/229, 370/230, 231, 232, 233, 234, 235, 236, 236.1, 370/236.2
See application file for complete search history.

(56) References Cited

U.S. PATENT DOCUMENTS

| | | | |
|---|---|---|---|
| 6,751,193 B1 | 6/2004 | Kudrimoti et al. | |
| 2004/0049613 A1* | 3/2004 | Kim et al. ........................ | 710/52 |
| 2004/0192391 A1* | 9/2004 | Nagai ............................ | 455/561 |
| 2005/0149470 A1* | 7/2005 | Fujie ................................ | 707/1 |
| 2005/0186982 A1* | 8/2005 | Chen et al. .................... | 455/522 |
| 2008/0212524 A1* | 9/2008 | Niwano ........................ | 370/329 |

FOREIGN PATENT DOCUMENTS

| | | |
|---|---|---|
| EP | 1089500 A | 4/2001 |
| EP | 1130872 A | 9/2001 |
| EP | 1303162 A | 4/2003 |
| EP | 1443719 A | 8/2004 |
| EP | 1482710 A | 12/2004 |

* cited by examiner

*Primary Examiner* — Chi H Pham
*Assistant Examiner* — Weibin Huang
(74) *Attorney, Agent, or Firm* — Sherry Womack

(57) ABSTRACT

A method of operating a communication station including queuing data units, estimating the transmission delay of at least one of the data units in the queue, and if the estimated transmission delay exceeds a threshold, requesting permission to transmit at least one data unit.

21 Claims, 2 Drawing Sheets

REQUESTING PERMISSION FROM A BASE STATION TO SEND PACKETS QUEUED AT A MOBILE STATION ACCORDING TO ITS TRANSMISSION DELAY

The present invention relates to a method of operating a communication station, a method of operating a communication system, a communication station and a communication system. The present invention has particular, but not exclusive, application to packet communication systems, especially mobile systems such as UMTS.

For the sake of convenience the present invention will be described with reference to UMTS (Universal Mobile Telecommunication System). However the present invention is applicable to other data unit or data packet communication systems.

The state of the art is described in input documents to 3GPP (Third Generation Partnership Project), particularly in relation to the Enhanced Uplink, otherwise known as High-Speed Uplink Packet Access (HSUPA). In the HSUPA feature of UMTS, a mechanism is required to enable a base station (BS) to prioritise effectively the allocation of uplink transmission resources between User Equipments (UEs).

Data for transmission from a UE to a BS is typically queued in buffers until it can be transmitted. A UE may have data units to transmit from a number of different streams, each with a different quality of service (QoS) delay target. Each stream may be assigned a different priority level, so that any queued data in the highest-priority stream is transmitted first. Data with different priorities may be buffered in different queues.

In order to transmit some data, the UE has to receive permission from the BS, typically in the form of a "grant" to use certain transmission resources for example a grant to transmit up to a certain rate, to transmit up to a certain power level, or to transmit for a certain period of time.

The BS needs information to enable it to decide which UEs should be granted permission to transmit, and at what rate, and in particular to be able to prioritise different UEs. To assist in this process, it is known for the UE to transmit requests for permission, and for the UE to transmit an indication of the amount of data in its buffers. Some prioritisation methods which the BS may use involve prioritising the UEs with the greatest amount of data in their buffers, or the UEs with the fullest buffers. However such methods will not necessarily achieve a good quality of service.

An object of the present invention is to improve the scheduling of the transmission of data units.

According to a first aspect of the invention there is provided a method of operating a communication station, the method comprising queuing data units, estimating the transmission delay of at least one of the data units in the queue, and, if the estimated transmission delay exceeds a threshold, requesting permission to transmit at least one data unit.

According to a second aspect of the invention there is provided a method of operating a communication system, comprising operating a communication station according to the first aspect of the invention and, at a further station, in response to receiving the request for permission to transmit, scheduling transmission of a data unit by the communication station.

According to a third aspect of the invention there is provided a communication station comprising means for communication, buffer memory means for storing data units in at least one queue, means for estimating the transmission delay of at least one of the data units in the at least one queue, and means responsive to the estimated transmission delay exceeding a threshold value for requesting permission to transmit at least one data unit.

According to a fourth aspect of the invention there is provided a communication system comprising a communication station and a further station, the stations having communications means whereby they can communicate with each other, the communication station having buffer memory means for storing data units in at least one queue, one of the stations having means for estimating the transmission delay of at least one of the data units in the at least one queue, and means responsive to the estimated transmission delay exceeding a threshold value for requesting permission from the further station to enable the communication station to transmit at least one data unit to the further station.

The method in accordance with the present invention enables the further station, which may comprise a base station, to take into account the likelihood of breaching any of a number of quality of service targets for different services and to allocate resources accordingly.

One possible metric for the prioritisation mechanism is to enable the required QoS (delay target) to be achieved for as many communication stations (or UEs) as possible, or for the most critical services. To achieve this target, the BS needs each UE to signal suitable information to enable it to work out what resources the UE would need if it were to avoid breaching any of its QoS targets.

The present invention will now be described, by way of example, with reference to the accompanying drawings, wherein.

Figure 1:
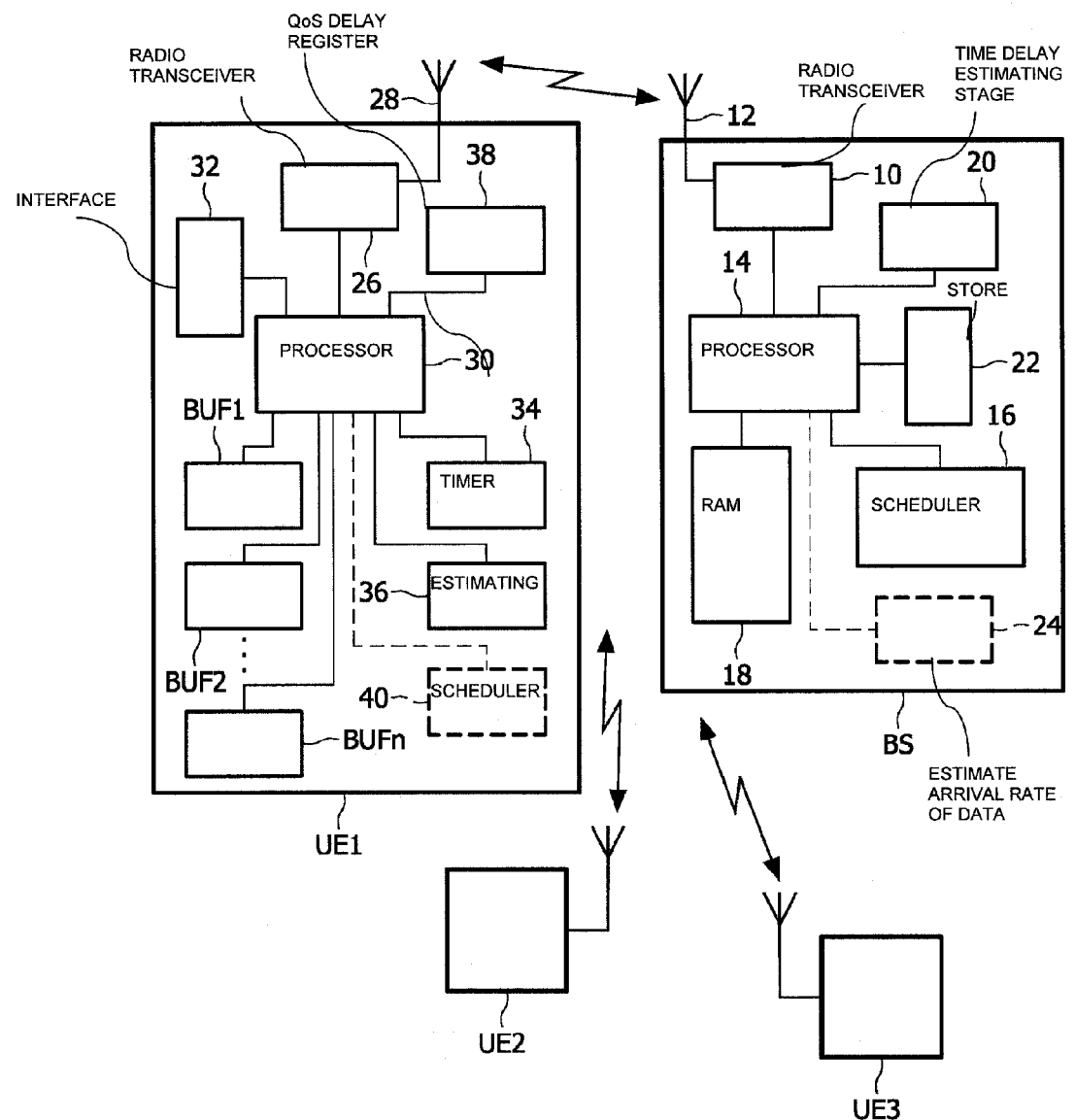
FIG. 1 is a block schematic diagram of a communication system.

The communication system shown in FIG. 1 comprises at least one base station BS and a plurality of User Equipments UE1, UE2 and UE3 geographically distributed within the radio coverage area of the base station(s). The UEs may be fixed or transportable, for example hand portable or mobile. As the UEs have substantially the same architecture only UE1 will be described in detail later.

The BS comprises a radio transceiver 10 coupled to an antenna 12 for propagating and receiving signals from the UEs. The transceiver 10 is coupled to a processor 14 which operates in accordance with software stored in a ROM (not shown). A scheduler 16 is coupled to the processor 14 and serves to schedule the transmission of data units by respective ones of the UEs. Data units received by the BS are stored in a buffer store comprising a RAM 18. Also connected to the processor 14 are a time delay estimating stage 20 and a store 22 for storing QoS time delay targets for the or each buffer in a UE. Optionally the BS may include a stage 24 for estimating the arrival rate of data. For the sake of clarity some of the stages of the BS have been shown separately but they may be formed integrally with the processor 14 or created by the processor 14 in accordance with pre-stored software.

The UE1 comprises a radio transceiver 26 coupled to an antenna 28 for propagating and receiving signals from the BS. The transceiver 26 is coupled to a processor 30 which operates in accordance with software stored in a ROM (not shown). One or a plurality of data unit buffer stores BUF1, BUF2, BUFn are coupled to the processor 30 and in operation it or they store, in queues, data units supplied to the UE or generated by an application via an interface 32. The buffer stores may be organized to so that the queues have different levels of priority. Also connected to the processor are a timer 34, an estimating stage 36 for determining the time a data unit has been stored or will be stored in a buffer store and estimating the transmission rate for the data in a buffer store, and a QoS time delay register 38 for storing the quality of service time delays for the or the respective buffer stores BUF1, BUF2, BUFn. Optionally the UE1 may include a scheduler 40 shown in broken lines. For the sake of clarity some of the stages of the UE1 have been shown separately but they may be formed integrally with the processor 30 or created by the processor 30 in accordance with pre-stored software.

In implementing the method in accordance with the present invention the UE estimates, in the processor 30, the total transmission delay for each unit of data, for example a packet, in the or each of the UE's buffer store. The total estimated transmission delay is the length of time the data has been in the buffer and/or the further estimated length of time before the data will be successfully transmitted. If the total estimated transmission delay exceeds a delay target or QoS the UE signals, by means of the processor 30, to the BS an indication that some data in its buffer is close to reaching its delay target.

Figure 2:
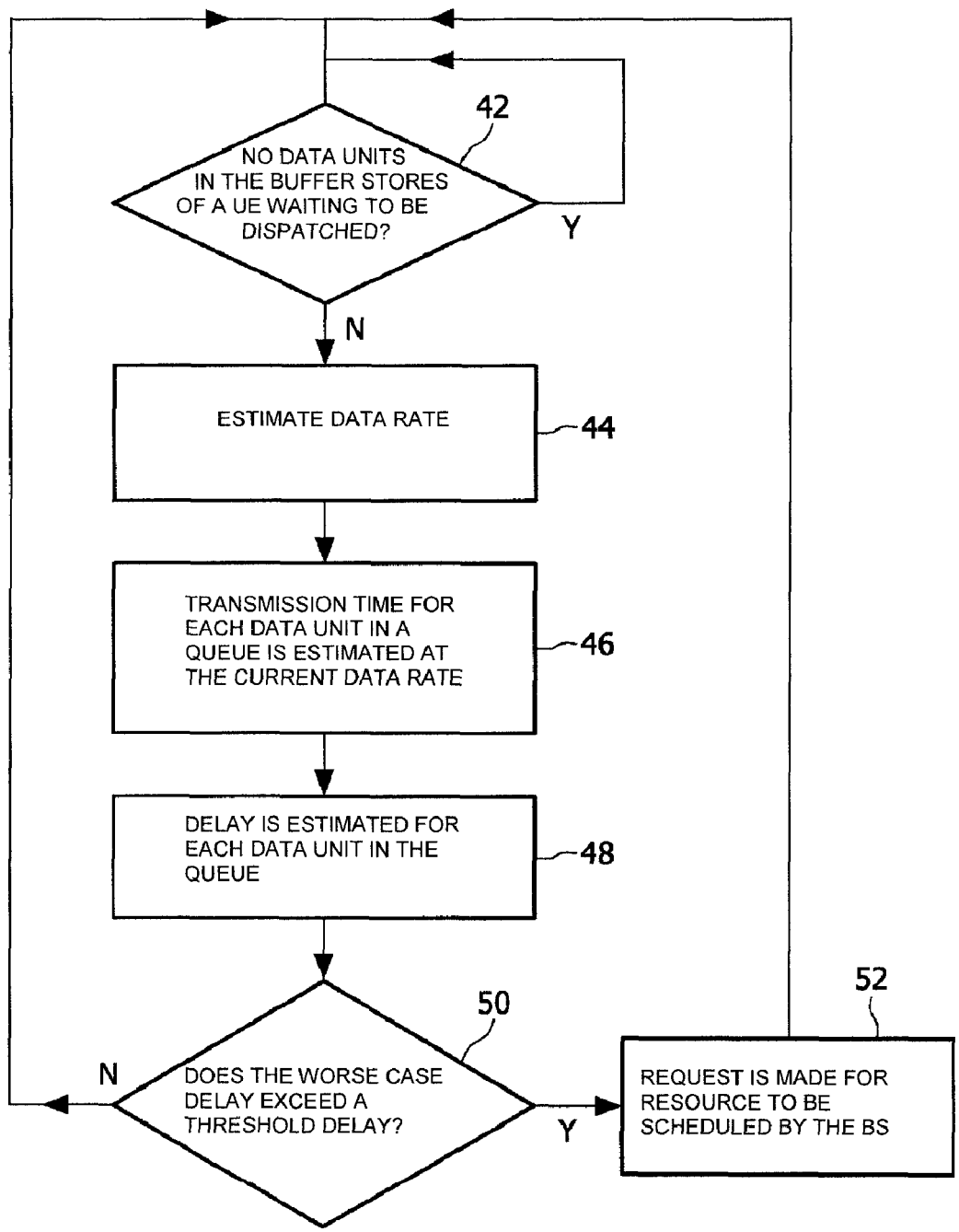
FIG. 2 is a flow chart relating to one method of implementing the method in accordance with the present invention.

The method is summarised by the flow chart shown in FIG. 2. In block 42 a check is made to see if there are no data units in the buffer stores of a UE waiting to be despatched. If the answer is Yes (Y) then the flow chart reverts to the input of the block 42. However if the answer is No (N) and there are data units in the buffer stores then in block 44 the data rate is estimated. In block 46 the transmission time for each data unit in a queue is estimated at the current data rate. In block 48 the delay is estimated for each data unit in the queue. In block 50 a check is made to see if the worse case delay exceeds a threshold delay, for example a QoS time delay, and if it does (Y) a request is made for resource to be scheduled by the BS in block 52. The request may include an indication of the status of the data unit, such as an indication that a delay target is likely to be breached. If the threshold delay is not exceeded (N) the flow chart reverts to the block 42.

The BS in response to the request for resource checks the demand for resource on the uplink and, if possible, schedules the transmission of the data unit. This information is transmitted on a downlink to the requesting UE.

This signalling of a request for resource by the UE to the BS could potentially be triggered by any of a number of events, for example:
a) a unit of data has been in the UE's buffer for more than a predetermined length of time;
b) the remaining time before the delay target for a particular unit of data is breached is less than a predetermined length of time; and/or
c) the fraction of the delay target that has elapsed for a particular data unit since arriving in the UE's buffer has exceeded a predetermined value.

In a variant of the method in accordance with the present invention, the UE could estimate and signal to the BS the additional length of time that is predicted to elapse before a given data unit is transmitted. This can be derived from the following two pieces of information:
a) the total of the amount of data ahead of the given data unit in its priority queue and the data in all queues of higher priority than the given data unit, and
b) some prediction of the data rate.

The prediction of the data rate could be, for example, that the data rate is
a) equal to the most recently granted data rate;
b) equal to the most recently used data rate;
c) an average of the recently granted data rates; or
d) an average of the recently used data rates.

A further variation of this embodiment could entail the UE taking into account the rate of arrival of data in the higher-priority queues. For example, if the amount of data in the higher-priority queues and ahead of the given data unit in its own priority queue is D, the predicted transmission rate is R and the predicted arrival rate in the higher priority queues is r, then the estimated time remaining before transmission of the data unit in question is given by $D/(R-r)$.

As a further enhancement of the method in accordance with the present invention, the UE can estimate the size of the additional transmission grant that it would need in order to transmit a data unit before it fails to meet its QoS target.

For example, if the remaining time before the QoS target is breached is T, then the additional rate $R_A$ that the UE requires could be estimated as $D/T+r-R$.

Thus a fourth potential trigger for the UE signalling a request for resource to the BS could be that the current or average granted transmission rate is less than, or within a predetermined margin of, the rate required for any, that is at least one, data unit in its buffers to meet its QoS target.

The UE could perform the necessary calculations for each data unit in its buffers, and transmit the necessary signalling when one of the potential triggers occurred for any of the data units. It may be sufficient to do the calculation only for the data unit most recently added to a queue.

Information pertaining to the potential triggers could be signalled to the UE, for example, information relating to any of the predetermined lengths of time, values or margins.

The BS could also instruct individual UEs or groups of UEs to switch their signalling on or off.

In a further embodiment of the invention, a predetermined proportion of the data units in a priority queue, or group of priority queues, could be permitted to fail their QoS target. For example, the calculations described above could be performed on the basis that the granted transmission rate needs to be such that 95% of the data units in a given priority queue will satisfy their QoS targets. The UE could perform the described signalling only if this criterion was predicted to fail over some predetermined period of time, i.e over an averaging period.

The UE may be informed of the delay target by the BS or network if there are two or more BSs controlled by a central controller.

The UE may have more than one queue with different QoS targets. It may use the information that one or more QoS targets is about to be breached in order to modify the scheduling of transmission of data units from each queue. For example, if the queues have priorities assigned to them, then these priorities could be modified by the UE in order to better meet QoS targets.

In yet a further variation of the method in accordance with the present invention, the calculations of required rate could be performed entirely at the BS. The UE could signal the elapsed delay for a data unit, together with the amount of data ahead of it in the queues, with or without information regarding the arrival rate of data in the higher-priority queues. In some embodiments an estimate of the latter information may be determined by the BS using the stage 24 to examine the received data rate on each priority level.

The BS may also need suitable information to determine its prioritisation of UEs even if none of them is about to fail a QoS target. Consequently, the signalling provided by implementing the method in accordance with the present invention could be additional to some basic signalling regarding the amount of data to transmit. Further, it is necessary to allow the possibility to give transmission permission to UEs which have only low-priority data with no QoS target, for example a file transfer.

Optionally the method in accordance with the present invention may include one or more of the following additional features:

a) It may be desirable to include other delays in deciding on the QoS, for example any known processing delays before data arrives in the queue, or any known transmission delays in the radio system.

b) If the queue contains data units, then the information within a data unit could have been generated at different times, which implies a different delay requirement. One approach would be to consider timing based on the oldest data in a data unit.

c) Other actions could be taken if the QoS criterion is not met, or predicted not to be met. For example data units could be discarded, which could help ensure that subsequent data can be delivered in time. Another possibility is that a connection or service could be dropped if the QoS is not achieved, or is not achievable). This would allow resources to be diverted to other users.

In further variant of the method in accordance with the present invention, the UEs are able to listen to each other's transmissions and determine which ones have data units which are likely to miss their QoS targets unless transmitted promptly. The UEs include a scheduler 40, (shown in broken lines in FIG. 1) by which a UE wishing to prioritise the sending of a data unit can schedule its despatch. The processor 30 generates a system wide message informing the BS and the other UEs of the planned despatch of the data unit.

In the present specification and claims the word "a" or "an" preceding an element does not exclude the presence of a plurality of such elements. Further, the word "comprising" does not exclude the presence of other elements or steps than those listed. The inclusion of reference numerals in the claims is not intended to be limiting.

From reading the present disclosure, other modifications will be apparent to persons skilled in the art. Such modifications may involve other features which are already known in the design, manufacture and use of communication systems and component parts therefor and which may be used instead of or in addition to features already described herein.

The invention claimed is:

1. A method of operating a communication station, the method comprising acts of:
   queuing data units;
   estimating the transmission delay of at least one of the data units in the queue based on an estimate of an additional length of time that is predicted to elapse before a given data unit is transmitted on the basis of a total of an amount of data ahead of the given data unit in its queue and the data in all queues of higher priority than the given data unit; and
   if the estimated transmission delay exceeds a threshold, requesting permission to transmit at least one data unit.

2. The method as claimed in claim 1, wherein the threshold is exceeded by a data unit being in the queue for more than a predetermined length of time.

3. The method as claimed in claim 1, wherein the threshold is exceeded by the remaining time before a delay target for a particular data unit is breached being less than a predetermined length of time.

4. The method as claimed in claim 1, wherein the threshold is exceeded by a fraction of a delay target that has elapsed for a particular data unit since arriving in the queue having exceeded a predetermined value.

5. The method as claimed in claim 1, wherein the threshold is exceeded by the current or average granted transmission rate being less than, or within a predetermined margin of the rate required for at least one data unit in the queue to meet a quality of service target.

6. The method as claimed in claim 1, wherein the transmission delay is estimated only for the data unit most recently added to the queue.

7. The method as claimed in claim 1, wherein the transmission delay is estimated on the basis of the oldest data in a data unit.

8. The method as claimed in claim 1, comprising an act of signaling the estimated additional length of time.

9. The method as claimed in claim 1, comprising an act of estimating the additional length of time on the basis of a prediction of the data rate.

10. The method as claimed in claim 9, wherein the prediction of the data rate is based on the data rate being one of the following:
    (a) equal to the most recently granted data rate;
    (b) equal to the most recently used data rate;
    (c) an average of the recently granted data rates; or
    (d) an average of the recently used data rates.

11. The method as claimed in claim 1, comprising acts of:
    queuing data units in at least two queues having different delay targets; and
    in response to information that one of the delay targets is about to be breached, modifying the scheduling of transmission of data units from each of the at least two queues.

12. The method as claimed in claim 1, comprising an act of receiving an indication of the threshold.

13. The method as claimed in claim 1 comprising an act of scheduling transmission of a data unit.

14. A method of operating a communication system, the method comprising acts of:
    queuing data units;
    estimating the transmission delay of at least one of the data units in the queue; and
    if the estimated transmission delay exceeds a threshold,
       requesting permission to transmit at least one data unit;
       estimating the additional length of time that is predicted to elapse before a given data unit is transmitted on the basis of the data in all queues of higher priority than the given data unit and
       signaling this estimate to a further station, and at the further station, in response to receiving the estimate of additional length of time that is predicted to elapse before a given data unit is transmitted, determining a data rate for use by the communication station when transmitting the data unit.

15. The method as claimed in claim 1, further comprising: receiving an indication of the threshold from a further station.

16. The method as claimed in claim 14, wherein the estimating of the additional length of time is on the basis of a total of an amount of data ahead of the given data unit in its queue.

17. A communication station comprising:
    means for communication;
    buffer memory means for storing data units in at least one queue;
    means for estimating the transmission delay of at least one of the data units in the at least one queue based on an estimate of an additional length of time that is predicted to elapse before a given data unit is transmitted on the basis of a total of an amount of data ahead of the given data unit in its queue and the data in all queues of higher priority than the given data unit; and means for requesting permission to transmit at least one data unit responsive to the estimated transmission delay exceeding a threshold value.

18. The communication station as claimed in claim 17, wherein the buffer memory means is adapted to queue data units in at least two queues having different delay targets, and, further comprising scheduling means responsive to information that one of the delay targets is about to be breached for modifying the scheduling of transmission of data units from each of the at least two queues.

19. The communication station as claimed in claim 17, wherein the means for communication is adapted to receive an indication of the threshold value.

20. A communication system comprising:
    a communication station; and
    a further station, the stations having communication means whereby they can communicate with each other, the communication station having buffer memory means for storing data units in at least one queue, one of the stations having means for estimating the transmission delay of at least one of the data units in the at least one queue based on an estimate of an additional length of time that is predicted to elapse before a given data unit is transmitted on the basis of a total of an amount of data ahead of the given data unit in its queue and the data in all queues of higher priority than the given data unit, and means for requesting permission from the further station responsive to the estimated transmission delay exceeding a threshold value to enable the communication station to transmit at least one data unit to the further station.

21. The communication system as claimed in claim 20, wherein the communication means is adapted to transmit an indication of the threshold value from the further station to the communication station.

* * * * *